US009928565B2

(12) United States Patent
Balci et al.

(10) Patent No.: US 9,928,565 B2
(45) Date of Patent: Mar. 27, 2018

(54) FLEX RENDERING BASED ON A RENDER TARGET IN GRAPHICS PROCESSING

(71) Applicant: QUALCOMM Incorporated, San Diego, CA (US)

(72) Inventors: Murat Balci, Orlando, FL (US); Avinash Seetharamaiah, Chuluota, FL (US); Christopher Paul Frascati, Oviedo, FL (US); Jonnala gadda Nagendra Kumar, Aliso Viejo, CA (US); Colin Christopher Sharp, Cardiff, CA (US); David Rigel Garcia Garcia, North York (CA)

(73) Assignee: QUALCOMM Incorporated, San Diego, CA (US)

(*) Notice: Subject to any disclaimer, the term of this patent is extended or adjusted under 35 U.S.C. 154(b) by 69 days.

(21) Appl. No.: 14/691,358

(22) Filed: Apr. 20, 2015

(65) Prior Publication Data
US 2015/0302546 A1 Oct. 22, 2015

Related U.S. Application Data

(60) Provisional application No. 61/982,147, filed on Apr. 21, 2014.

(51) Int. Cl.
G06T 15/00 (2011.01)
G06T 1/20 (2006.01)
(Continued)

(52) U.S. Cl.
CPC ............. *G06T 1/20* (2013.01); *G06T 1/60* (2013.01); *G06T 11/40* (2013.01); *G09G 5/00* (2013.01); *G09G 2330/021* (2013.01)

(58) Field of Classification Search
CPC ......... G06T 15/005; G06T 1/20; G06T 15/04; G09G 5/363; G06F 9/3851
(Continued)

(56) References Cited

U.S. PATENT DOCUMENTS 5,777,621 A * 7/1998 Schneider ............... G06T 15/00
345/428
6,075,546 A 6/2000 Hussain et al.
(Continued)

FOREIGN PATENT DOCUMENTS

WO 2006122212 A2 11/2006

OTHER PUBLICATIONS

Second Written Opinion from International Application No. PCT/US2015/026910, dated Apr. 22, 2016, 7 pp.
(Continued)

*Primary Examiner* — Ke Xiao
*Assistant Examiner* — Gordon Liu
(74) *Attorney, Agent, or Firm* — Shumaker & Sieffert, P.A.

(57) ABSTRACT

A device comprising a graphics processing unit (GPU) includes a memory and at least one processor. The at least one processor may be configured to: receive a GPU command packet that indicates the GPU may select between a direct rendering mode or a binning rendering mode for a portion of a frame to be rendered by the GPU, determine whether to use the direct rendering mode or the binning rendering mode for the portion of the frame to be rendered by the GPU based on at least one of: information in the received command packet or a state of the GPU, and render the portion of the frame using the determined direct rendering mode or the binning rendering mode.

30 Claims, 10 Drawing Sheets

(51) Int. Cl.
  *G06T 1/60* (2006.01)
  *G09G 5/00* (2006.01)
  *G06T 11/40* (2006.01)

(58) Field of Classification Search
  USPC ........................................................ 345/522
  See application file for complete search history.

(56) References Cited

U.S. PATENT DOCUMENTS

| | | | |
|---|---|---|---|
| 6,466,217 B1 | 10/2002 | Hsieh et al. | |
| 8,675,002 B1* | 3/2014 | Andonieh | G06F 15/167 345/505 |
| 8,982,136 B2* | 3/2015 | Ribble | G06T 15/005 345/422 |
| 2004/0156613 A1* | 8/2004 | Hempel | H04N 5/913 386/328 |
| 2009/0073187 A1* | 3/2009 | Rampson | G06T 11/206 345/619 |
| 2012/0206447 A1* | 8/2012 | Hutchins | G06T 15/005 345/419 |
| 2012/0293519 A1 | 11/2012 | Ribble et al. | |
| 2013/0135322 A1 | 5/2013 | Seetharamaiah et al. | |

OTHER PUBLICATIONS

International Search Report and Written Opinion for International Application No. PCT/US2015/026910; dated Aug. 21, 2015, 11 pp.
Response to Written Opinion dated Aug. 21, 2015, from International Application No. PCT/US2015/026910, filed on Feb. 20, 2016, 6 pp.
Pixar, "The RenderMan Interface" Version 3.2.1, Nov. 2005, 226 pp.
Gee, Kevin, "Introduction to the Direct3D 11 Graphics Pipeline", XNA Developer Connection, Microsoft Corporation, Nvision 08, Aug. 25 through 27, 2008, 55 pp.
Daly et al. "X3D: Extensible 3d Graphics Standard" IEE Signal Processing Magazine. Issue 130, Nov. 2007, 6 pp.
Tianyun Ni, "Direct Compute-Bring GPU Computer to Mainstream", NVIDIA, presented at GPU Technology Conference, San Jose, California, Oct. 1, 2009, 51 pp.
Zink et al., "Practical Rendering & Computation with Direct3D 11," Overview of Direct 3D, CRC Press, Nov. 2, 2011, 7 pp.
Sherrod et al. "Begining DirectX 11 Game Programming," Course Technology, a part of Cenage Learning, May 12, 2011, 1129 pp.
Jones, Wendy. "Begining DirectX 10 Game Programming," Course Technology, a part of Cenage Learning, May 12, 2011, 1047 pp.
Luna, Frank D. "Introduction to 3D Game Programming with DirectX 9.0c: A Shader Approach," Jones & Bartlett Learning, Sep. 23, 2010, 2387 pp.
Kowalkski, Cyril. "A closer look at DirectX 12" The Tech Report: PC Hardware Explored, URL: http://techreport.com/review/26239/a-closer-look-at-directx-12 ; Mar. 30, 2014, 11 pp.
International Preliminary Report on Patentability from International Application No. PCT/US2015/026910, dated Jul. 13, 2016, 8 pp.

* cited by examiner

FLEX RENDERING BASED ON A RENDER TARGET IN GRAPHICS PROCESSING

This application claims priority to U.S. Provisional Application No. 61/982,147, filed Apr. 21, 2014, the entire contents of which are incorporated herein by reference.

TECHNICAL FIELD

This disclosure relates to techniques for graphics processing.

BACKGROUND

Visual content for display, such as content for graphical user interfaces and video games, may be generated by a graphics processing unit (GPU). A GPU may convert two-dimensional or three-dimensional (3D) objects into a two-dimensional (2D) pixel representation that may be displayed. Converting information about 3D objects into a bit map that can be displayed is known as pixel rendering, and requires considerable memory and processing power. In the past, 3D graphics capability was available only on powerful workstations. However, now 3D graphics accelerators are commonly found in personal computers (PC), as well as in embedded devices, such as smart phones, tablet computers, portable media players, portable video gaming consoles, and the like. Typically, embedded device have less computational power and memory capacity as compared to conventional PCs. As such, increased complexity in 3D graphics rendering techniques presents difficulties when implementing such techniques on an embedded system.

SUMMARY

In general, this disclosure describes techniques that enable a GPU to switch between direct rendering and binning in graphics processing, techniques for enabling a GPU to determine a rendering mode, and techniques for performing a executing a rendering loop with a GPU.

In one example of the disclosure, a method of graphics processing comprises receiving, by a graphics processing unit (GPU), a GPU command packet that indicates the GPU may select between a direct rendering mode or a binning rendering mode for a portion of a frame to be rendered by the GPU, determining, by the GPU, whether to use the direct rendering mode or the binning rendering mode for the portion of the frame to be rendered by the GPU based on at least one of: information in the received command packet or a state of the GPU, and rendering, by the GPU, the portion of the frame using the determined direct rendering mode or the binning rendering mode.

Another example in accordance with the techniques of this disclosure describes a device comprising a graphics processing unit (GPU). The GPU includes a memory and at least one processor. The at least one processor may be configured to: receive a GPU command packet that indicates the GPU may select between a direct rendering mode or a binning rendering mode for a portion of a frame to be rendered by the GPU, determine whether to use the direct rendering mode or the binning rendering mode for the portion of the frame to be rendered by the GPU based on at least one of: information in the received command packet or a state of the GPU, and render the portion of the frame using the determined direct rendering mode or the binning rendering mode.

Another example in accordance with the techniques of this disclosure describes a device. The device comprises means for receiving, a GPU command packet that indicates the GPU may select between a direct rendering mode or a binning rendering mode for a portion of a frame to be rendered by the GPU, means for determining whether to use the direct rendering mode or the binning rendering mode for the portion of the frame to be rendered by the GPU based on at least one of: information in the received command packet or a state of the GPU, and means for rendering the portion of the frame using the determined direct rendering mode or the binning rendering mode.

Another example in accordance with the techniques of this disclosure describes a non-transitory computer-readable storage medium that includes instructions stored thereon. The instructions, when executed, may cause at least one processor to: receive a GPU command packet that indicates a GPU may select between a direct rendering mode or a binning rendering mode for a portion of a frame to be rendered by the GPU, determine whether to use the direct rendering mode or the binning rendering mode for the portion of the frame to be rendered by the GPU based on at least one of: information in the received command packet or a state of the GPU, and render the portion of the frame using the determined direct rendering mode or the binning rendering mode.

DETAILED DESCRIPTION

Figure 1:
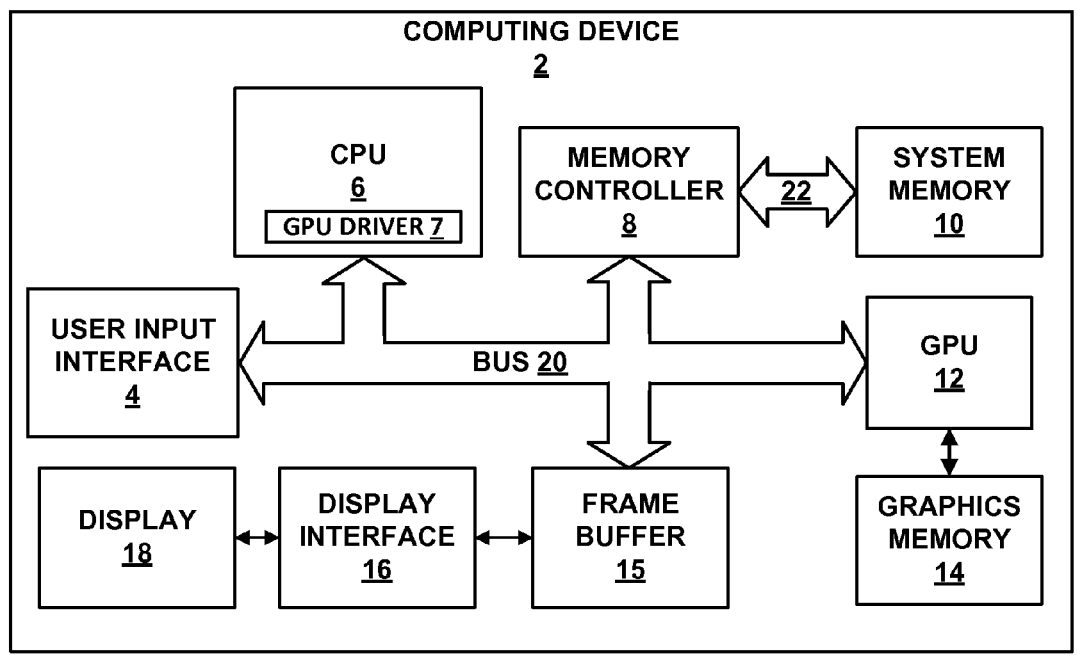
FIG. 1 is a block diagram illustrating an example computing device that may be used to determine whether to use a particular rendering mode in accordance with the techniques of this disclosure.

This disclosure relates to techniques for graphics processing, and more specifically to techniques that enable a GPU to determine a rendering mode and switch between rendering modes in a graphics processing system.

Current graphics rendering systems typically utilize a binning rendering mode (sometimes called tile-based rendering) or a direct rendering mode to render a scene. In binning rendering, one frame of a 2D or 3D scene is rendered by breaking the frame into smaller parts (e.g., rectangular bins or tiles) and rendering each of these bins separately. Binning rendering is useful for applications where little dedicated fast graphics memory (GMEM) is available, such as for mobile applications, as well as in instances where the memory bandwidth is limited. The size of the tiles can be configured to represent the amount of data that is available in the GMEM. For example, if the GMEM is able to store 512 kB, the size of a tile may be configured so that that pixel data contained in that tile is less than or equal to 512 kB.

Graphics processing in a direct rendering mode, on the other hand, does not break a frame into smaller bins. Instead, the entirety of a frame is rendered at once. In some graphics processing systems (e.g., a graphics processing system on a mobile device), there is not enough GMEM to hold an entire frame of pixel data. Instead, for a direct rendering mode, slower system memory, such as dynamic random access memory (DRAM), may be used to render the frame.

Previous GPU command packets each included only a single indirect buffer (IB). In order to render a scene, a GPU driver generated multiple command packets, one command packet for each indirect buffer required to render a scene. The CPU and memory overhead of generating multiple command packets each comprising a small number of triangles to be rendered, referred to as the "small batch" problem, can be very high. As an example, the GPU driver may do a disproportionately large amount of work when an application is only changing a minimal amount of state between draw calls. The techniques of this disclosure may reduce the CPU and memory overhead by including all the IBs needed to render a scene in a single command packet rather than in many small packets, and by moving some of the rendering load from the GPU driver executing on the CPU to the GPU itself.

Additionally, a CPU-based GPU driver may cause the CPU and GPU to have to loop through a rendering loop numerous times to generate all the command packets necessary to render a scene, and to render that scene. The rendering loop is the loop that the GPU driver executes to render each individual bin for a frame to be rendered. The techniques of this disclosure may reduce or eliminate rendering loops because of the additional rendering information, e.g. bins, that are incorporated into a command packet, and by moving rendering logic from the GPU driver to the GPU.

The techniques of this disclosure also allow for finer-grained, real-time GPU state information (e.g., heuristics) that the GPU may use to determine the rendering mode for a scene. Whereas a CPU-based GPU driver can request GPU state, such as GPU processing load from a GPU, the driver executing on the CPU can only do so using polling requests and/or accumulation of statistics from the GPU. Thus, any GPU state that the CPU driver can access may not be accurate, and may not be up-to-date. The techniques of this disclosure related to determining GPU state thus allow for more accurate determination of a render mode based on more accurate and up-to-date GPU state.

Additionally, the techniques of this disclosure include render target information, and/or CPU-accumulated heuristics such as the resolution of the scene to be rendered, in the command packet. Because the GPU has access to the render target information, the GPU itself may determine whether to render a scene using direct mode or binning mode based at least in part on the command packet, as well as other GPU state heuristics, such as GPU load and power consumption, rather than having the CPU determine a rendering mode for the GPU to use without consideration of GPU state. Using direct rendering mode may improve rendering performance when the amount of geometry to be rendered is low, whereas a binning rendering mode may save power relative to direct rendering. Thus, allowing the GPU to select between direct and indirect rendering provides flexibility for the GPU to optimize rendering based on power, performance, and other constraints.

In general, direct rendering mode may be slower than binning rendering mode. However, binning rendering mode has some inherent overhead. However, if the direct mode rendering mode load is light enough, then using direct rendering mode may be preferable to binning mode. Binning rendering mode may be preferable when there is low amounts of overdraw and thus, lower overhead. Overdraw corresponds to a number of times a single pixel is rendered/updated per frame, e.g. due to overlapping triangles.

High overdraw may cause high bandwidth utilization and interaction with (relatively slower) system memory for direct rendering mode. The heuristics described herein may allow the GPU to determine a point at which direct rendering mode is faster than binning rendering mode based on factors such as the number of pixels rendered, overdraw, clock speeds, GPU architecture, as non-limiting examples.

In one example of the disclosure, a method of graphics processing comprises receiving, by a GPU, a command packet that indicates the GPU may select between a direct rendering mode or a binning rendering mode for rendering a portion of a frame to be rendered by the GPU. The GPU may determine whether to use a direct rendering mode or a binning mode rendering for a portion of a frame to be rendered by the GPU based on at least one of: the received command packet or GPU state. The GPU may render, the portion of the frame using the determined direct rendering mode or the binning rendering mode.

FIG. 1 is a block diagram illustrating an example computing device that may be used to determine whether to use a particular rendering mode in accordance with the techniques of this disclosure. Computing device 2 may comprise, for example, a personal computer, a desktop computer, a laptop computer, a tablet computer, a computer workstation, a video game platform or console, a mobile telephone such as, e.g., a cellular or satellite telephone, a landline telephone, a smartphone, a handheld device such as a portable video game device or a personal digital assistant (PDA), a personal music player, a video player, a display device, a television, a television set-top box, a server, an intermediate network device, a mainframe computer, any mobile device, or any other type of device that processes and/or displays graphical data.

As illustrated in the example of FIG. 1, computing device 2 may include a user input interface 4, a central processing unit (CPU) 6, a memory controller 8, a system memory 10, a graphics processing unit (GPU) 12, a graphics memory 14, a display interface 16, a display 18 and buses 20 and 22. Note that in some examples, graphics memory 14 may be "on-chip" with GPU 12. In some cases, all hardware elements show in FIG. 1 may be on-chip, for example, in a system on a chip (SoC) design. User input interface 4, CPU 6, memory controller 8, GPU 12 and display interface 16 may communicate with each other using bus 20. Memory controller 8 and system memory 10 may also communicate with each other using bus 22. Buses 20, 22 may be any of a variety of bus structures, such as a third generation bus (e.g., a HyperTransport bus or an InfiniBand bus), a second generation bus (e.g., an Advanced Graphics Port bus, a Peripheral Component Interconnect (PCI) Express bus, or an Advanced eXentisible Interface (AXI) bus) or another type of bus or device interconnect. It should be noted that the specific configuration of buses and communication interfaces between the different components shown in FIG. 1 is merely exemplary, and other configurations of computing devices and/or other graphics processing systems with the same or different components may be used to implement the techniques of this disclosure.

CPU 6 may comprise a general-purpose or a special-purpose processor that controls operation of computing device 2. A user may provide input to computing device 2 to cause CPU 6 to execute one or more software applications. The software applications that execute on CPU 6 may include, for example, an operating system, a word processor application, an email application, a spread sheet application, a media player application, a video game application, a graphical user interface application or another program. Additionally, CPU 6 may execute a GPU driver 7 for controlling the operation of GPU 12. The user may provide input to computing device 2 via one or more input devices (not shown) such as a keyboard, a mouse, a microphone, a touch pad or another input device that is coupled to computing device 2 via user input interface 4.

The software applications that execute on CPU 6 may include one or more graphics rendering instructions that instruct CPU 6 to cause the rendering of graphics data to display 18. In some examples, the software instructions may conform to a graphics application programming interface (API), such as, e.g., an Open Graphics Library (OpenGL®) API, an Open Graphics Library Embedded Systems (OpenGL ES) API, a Direct3D API, an X3D API, a RenderMan API, a WebGL API, or any other public or proprietary standard graphics API. The instructions may also conform to so-called heterogeneous computing libraries, such as OpenCL, and/or DirectCompute in various examples. In order to process the graphics rendering instructions, CPU 6 may issue one or more graphics rendering commands to GPU 12 (e.g., through GPU driver 7) to cause GPU 12 to perform some or all of the rendering of the graphics data. In some examples, the graphics data to be rendered may include a list of graphics primitives, e.g., points, lines, triangles, quadrilaterals, triangle strips, etc.

Memory controller 8 facilitates the transfer of data going into and out of system memory 10. For example, memory controller 8 may receive memory read and write commands, and service such commands with respect to memory system 10 in order to provide memory services for the components in computing device 2. Memory controller 8 is communicatively coupled to system memory 10 via memory bus 22. Although memory controller 8 is illustrated in FIG. 1 as being a processing module that is separate from both CPU 6 and system memory 10, in other examples, some or all of the functionality of memory controller 8 may be implemented on one or both of CPU 6 and system memory 10.

System memory 10 may store program modules and/or instructions that are accessible for execution by CPU 6 and/or data for use by the programs executing on CPU 6. For example, system memory 10 may store a window manager application that is used by CPU 6 to present a graphical user interface (GUI) on display 18. In addition, system memory 10 may store user applications and application surface data associated with the applications. System memory 10 may additionally store information for use by and/or generated by other components of computing device 2. For example, system memory 10 may act as a device memory for GPU 12 and may store data to be operated on by GPU 12 as well as data resulting from operations performed by GPU 12. For example, system memory 10 may store any combination of texture buffers, depth buffers, stencil buffers, vertex buffers, frame buffers, or the like. System memory 10 may include one or more volatile or non-volatile memories or storage devices, such as, for example, random access memory (RAM), static RAM (SRAM), dynamic RAM (DRAM), read-only memory (ROM), erasable programmable ROM (EPROM), electrically erasable programmable ROM (EEPROM), Flash memory, a magnetic data media or an optical storage media.

GPU 12 may be configured to perform graphics operations to render one or more graphics primitives to display 18. Thus, when one of the software applications executing on CPU 6 requires graphics processing, CPU 6 may provide graphics commands and graphics data to GPU 12 for rendering to display 18. The graphics data may include, e.g., drawing commands, state information, primitive information, texture information, etc. GPU 12 may, in some instances, be built with a highly-parallel structure that provides more efficient processing of complex graphic-related operations than CPU 6. For example, GPU 12 may include a plurality of processing elements that are configured to operate on multiple vertices or pixels in a parallel manner. The highly parallel nature of GPU 12 may, in some instances, allow GPU 12 to draw graphics images (e.g., GUIs and two-dimensional (2D) and/or three-dimensional (3D) graphics scenes) onto display 18 more quickly than drawing the scenes directly to display 18 using CPU 6.

GPU 12 may, in some instances, be integrated into a motherboard of computing device 2. In other instances, GPU 12 may be present on a graphics card that is installed in a port in the motherboard of computing device 2 or may be otherwise incorporated within a peripheral device configured to interoperate with computing device 2. GPU 12 may include one or more processors, such as one or more microprocessors, application specific integrated circuits (ASICs), field programmable gate arrays (FPGAs), digital signal processors (DSPs), or other equivalent integrated or discrete logic circuitry.

GPU 12 may be directly coupled to graphics memory 14. Thus, GPU 12 may read data from and write data to graphics memory 14 without using bus 20. In other words, GPU 12 may process data locally using a local storage, instead of off-chip memory. This allows GPU 12 to operate in a more efficient manner by eliminating the need of GPU 12 to read and write data via bus 20, which may experience heavy bus traffic. In some instances, however, GPU 12 may not include a separate memory, but instead utilize system memory 10 via bus 20. Graphics memory 14 may include one or more volatile or non-volatile memories or storage devices, such as, e.g., random access memory (RAM), static RAM (SRAM), dynamic RAM (DRAM), erasable programmable ROM (EPROM), electrically erasable programmable ROM (EEPROM), Flash memory, a magnetic data media or an optical storage media.

CPU 6 and/or GPU 12 may store rendered image data in a frame buffer 15. Frame buffer 15 may be an independent memory or may be is allocated within system memory 10. Display interface 16 may retrieve the data from frame buffer 15 and configure display 18 to display the image represented by the rendered image data. In some examples, display interface 16 may include a digital-to-analog converter (DAC) that is configured to convert the digital values retrieved from the frame buffer into an analog signal consumable by display 18. In other examples, display interface 16 may pass the digital values directly to display 18 for processing. Display 18 may include a monitor, a television, a projection device, a liquid crystal display (LCD), a plasma display panel, a light emitting diode (LED) array, such as an organic LED (OLED) display, a cathode ray tube (CRT) display, electronic paper, a surface-conduction electron-emitted display (SED), a laser television display, a nanocrystal display or another type of display unit. Display 18 may be integrated within computing device 2. For instance, display 18 may be a screen of a mobile telephone. Alternatively, display 18 may be a stand-alone device coupled to computer device 2 via a wired or wireless communications link. For instance, display 18 may be a computer monitor or flat panel display connected to a personal computer via a cable or wireless link.

According to one example of the disclosure, CPU 6 and/or GPU driver 7 may be configured to generate a GPU command packet that indicates that GPU 12 may select between a direct rendering mode and a binning rendering mode. The GPU command packet may comprise a GPU command packet having a PM4 ("Programming Model 4") format in various examples, as will be discussed in greater detail herein.

The command packet may include a rendering scene descriptor, commands for rendering a frame, such as indirect buffer information, as well as configuration data (e.g., configuration pairs), and information about the scene to be rendered, such as the resolution (e.g., height and width in pixels) of the scene that is to be rendered. GPU 12 may determine whether to use direct mode rendering or binning mode rendering to render a graphical scene based at least in part on the information contained in the received command packet. However, the command packet may not indicate the preferred rendering mode directly.

The render target descriptor includes configuration information, preambles, rendering, binning and command buffer pointers for each rendering mode that GPU 12 may execute. In some examples, the rendering target descriptor may also include information that GPU 12 may use to determine the rendering mode for the current scene. For example, the render target descriptor may also indicate the height and width of bins to be used for rendering using binning rendering mode. GPU 12 may examine the configuration information and based on the information of the render target descriptor, determine the rendering mode for the current scene. Based on the determined rendering mode, GPU 12 executes the instructions in the command buffers corresponding to the target rendering mode as needed.

In terms of the indirect buffer information included in the command packet, the command packet may include pointers to: one or more indirect buffers, color unresolve buffers, and depth stencil unresolve buffers. The command packet may also include most significant bits, and lengths of these indirect buffers. The type of PM4 command is included in the MSBs. GPU 12 may use the unresolve buffers GPU 12 may read values into GPU memory from an external memory, such as system memory 10. GPU 12 may perform the unresolve process when only a portion of a scene is being updated with new data, e.g. to preserve pixel data that does not change across more than one scene.

The command packet may also include various "clear" (also referred to as "discard") rectangles. Clear rectangles may indicate regions of a framebuffer, for example of a UI, which are not preserved from one frame to a next. GPU 12 may not load pixel or geometry data from the regions specified by the clear rectangles.

GPU 12 may also determine whether to use direct rendering or binning rendering based on GPU state heuristics. Examples of GPU heuristics may include: GPU processing load, GPU power consumption, and/or GPU memory usage or any other state parameter of GPU 12. As an example of determining whether to use direct rendering or binning, GPU 12 may switch from a direct rendering mode to conserve power when GPU power consumption exceeds a threshold power consumption. GPU 12 may similarly switch from a binning rendering mode to a direct rendering mode when power consumption or GPU load is low.

In accordance with the techniques of this disclosure, GPU 12 may be configured to receive the render target descriptor that indicates the GPU may select between a direct rendering mode or a binning rendering mode for rendering a portion of a frame, determine whether to use a direct rendering mode or a binning mode rendering for a portion of a frame to be rendered by the GPU based on at least one of the received command packet or GPU state, and render the portion of the frame using the determined direct rendering mode or the binning rendering mode.

Figure 2:
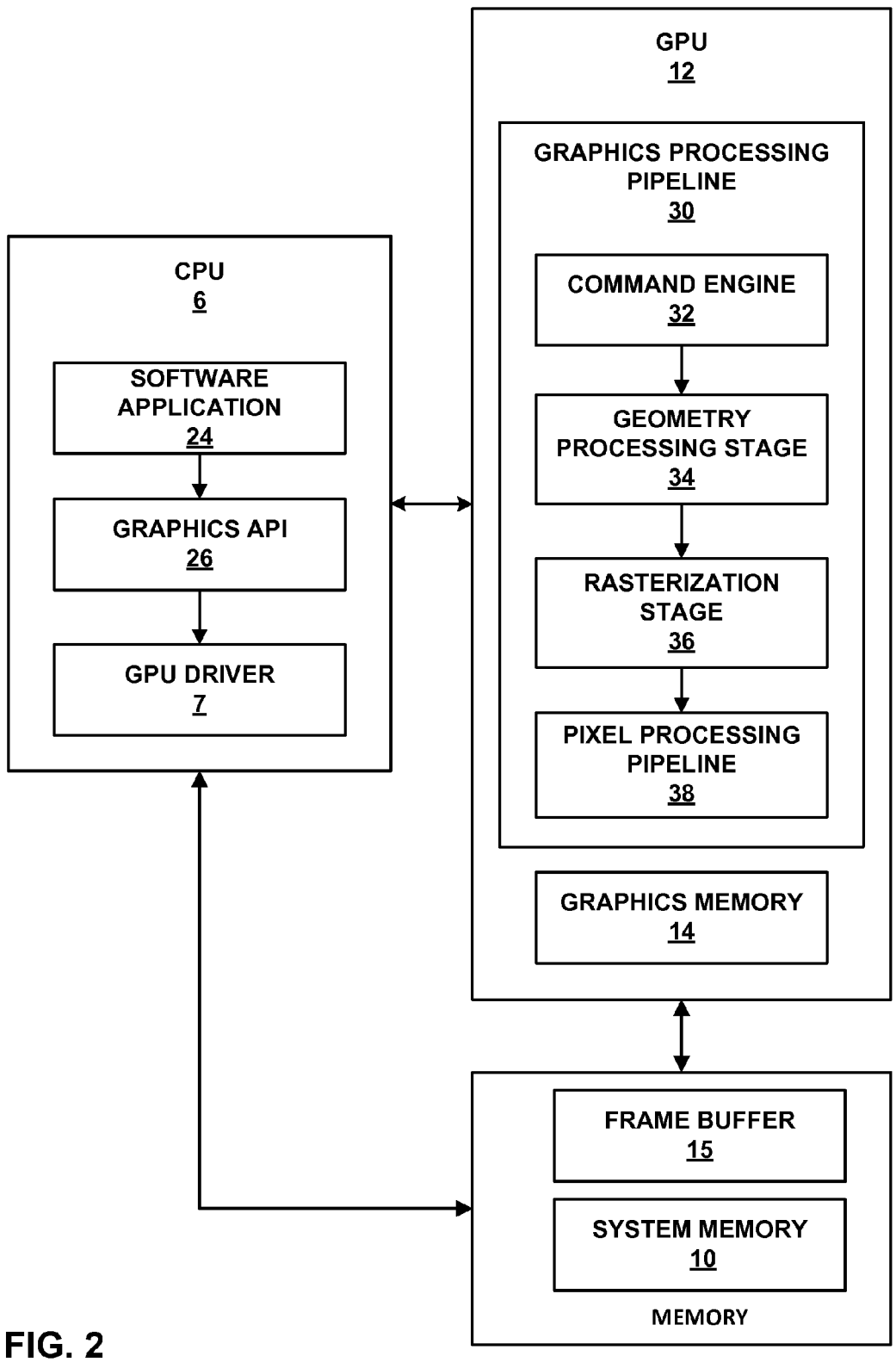
FIG. 2 is a block diagram illustrating example implementations of CPU 6, GPU 12, and system memory 10 of FIG. 1 in further detail.

FIG. 2 is a block diagram illustrating example implementations of CPU 6, GPU 12, and system memory 10 of FIG. 1 in further detail. CPU 6 may include at least one software application 24, a graphics API 26, and a GPU driver 7, each of which may be one or more software applications or services that execute on CPU 6. GPU 12 may include a graphics processing pipeline 30 that includes a plurality of graphics processing stages that operate together to execute graphics processing commands. GPU 12 may be configured to execute graphics processing pipeline 30 in a variety of rendering modes, including a binning rendering mode and a direct rendering mode. As shown in FIG. 2, graphics processing pipeline 30 may include a command engine 32, a geometry processing stage 34, a rasterization stage 36, and a pixel processing pipeline 38. Each of the components in graphics processing pipeline 30 may be implemented as fixed-function components, programmable components (e.g., as part of a shader program executing on a programmable shader unit), or as a combination of fixed-function and programmable components. Memory available to CPU 6 and GPU 12 may include system memory 10 and frame buffer 15. Frame buffer 15 may be a part of system memory 10 or may be separate from system memory 10. Frame buffer 15 may store rendered image data.

Software application 24 may be any application that utilizes the functionality of GPU 12. For example, software application 24 may be a GUI application, an operating system, a portable mapping application, a computer-aided design program for engineering or artistic applications, a video game application, or another type of software application that uses 2D or 3D graphics.

Software application 24 may include one or more drawing instructions that instruct GPU 12 to render a graphical user interface (GUI) and/or a graphics scene. For example, the drawing instructions may include instructions that define a set of one or more graphics primitives to be rendered by GPU 12. In some examples, the drawing instructions may, collectively, define all or part of a plurality of windowing surfaces used in a GUI. In additional examples, the drawing instructions may, collectively, define all or part of a graphics scene that includes one or more graphics objects within a model space or world space defined by the application.

Software application 24 may invoke GPU driver 7, via graphics API 26, to issue one or more commands to GPU 12 for rendering one or more graphics primitives into displayable graphics images. In various examples, the commands may comprise so-called "packets" of data which may include commands, as well as other information related to rendering a scene (i.e. one or more frames). For example, software application 24 may invoke GPU driver 7, via graphics API 26, to provide primitive definitions to GPU 12. In some instances, the primitive definitions may be provided to GPU 12 in the form of a list of drawing primitives, e.g., triangles, rectangles, triangle fans, triangle strips, etc. The primitive definitions may include vertex specifications that specify one or more vertices associated with the primitives to be rendered. The vertex specifications may include positional coordinates for each vertex and, in some instances, other attributes associated with the vertex, such as, e.g., color coordinates, normal vectors, and texture coordinates. The primitive definitions may also include primitive type information (e.g., triangle, rectangle, triangle fan, triangle strip, etc.), scaling information, rotation information, and the like. Based on the instructions issued by software application 24 to GPU driver 7, GPU driver 7 may formulate one or more commands that specify one or more operations for GPU 12 to perform in order to render the primitive. When GPU 12 receives a command from CPU 6, graphics processing pipeline 30 decodes the command and configures one or more processing elements within graphics processing pipeline 30 to perform the operation specified in the command. After performing the specified operations, graphics processing pipeline 30 outputs the rendered data to frame buffer 15 associated with a display device. Graphics pipeline 30 may be configured to execute in one of a plurality of different rendering modes, including a binning rendering mode and a direct rendering mode. The operation of the binning rendering mode and the direct rendering mode will be discussed in more detail below.

GPU driver 7 may be further configured to compile one or more shader programs, and to download the compiled shader programs onto one or more programmable shader units contained within GPU 12. The shader programs may be written in a high level shading language, such as, e.g., an OpenGL Shading Language (GLSL), a High Level Shading Language (HLSL), a C for Graphics (Cg) shading language, etc. The compiled shader programs may include one or more instructions that control the operation of a programmable shader unit within GPU 12. For example, the shader programs may include vertex shader programs and/or pixel shader programs. A vertex shader program may control the execution of a programmable vertex shader unit or a unified shader unit, and include instructions that specify one or more per-vertex operations. A pixel shader program may include pixel shader programs that control the execution of a programmable pixel shader unit or a unified shader unit, and include instructions that specify one or more per-pixel operations.

GPU driver 7 may also send commands, e.g. command packets consisting of one or more commands, headers, render scene descriptors, buffers, etc. to GPU 12 that define the rendering mode that GPU 12 should use when rendering a frame or a portion of a frame. For example, GPU driver 7 may determine that a particular frame should be rendered using direct mode rendering, and another frame should be rendered using binning mode rendering. GPU driver 7 may also instruct GPU 12 to determine which rendering mode to when rendering a portion of a frame by sending a GPU command packet to GPU 12.

The techniques of this disclosure enable GPU 12 to select between direct mode rendering and binning mode rendering without the intervention of another processing unit, such as GPU driver 7 executing on CPU 6. Previous techniques for selecting between direct and binning rendering modes could require GPU driver 7 and/or CPU 6 to perform large numbers of calculations associated with heuristics in order to determine and instruct GPU 12 which rendering mode to use when rendering a particular frame or part of a frame. The heuristic-based calculations that the driver performed could cause high amounts of CPU utilization, which could impact application performance, and overall responsiveness of computing device 2 in some cases.

As indicated above, GPU 12 controls the execution sequence and order of queued rendering commands for the mode determined based on information from a received command packet and/or based on GPU state. The GPU state may comprise the real time state and statistics that GPU 12 maintains, for example, related to power consumption, memory consumption, workload information, and/or other state or profiling information.

To enable GPU 12 to select between direct rendering mode and binning rendering mode, CPU 6 may generate a GPU command packet (e.g., a render scene descriptor), and transmit the GPU command packet to GPU 12. In various examples, the command packet may comprise a PM4 packet. As described above, the PM4 packet may include pointers to one or more IBs, render target information including screen resolution, bin widths (e.g., in 16 pixel multiples), resolve buffers, clear regions, and other information.

Graphics processing pipeline 30 may be configured to receive one or more graphics processing commands from CPU 6, via GPU driver 7, and to execute the graphics processing commands to generate displayable graphics images. As discussed above, graphics processing pipeline 30 includes a plurality of stages that operate together to execute graphics processing commands. It should be noted, however, that such stages need not necessarily be implemented in separate hardware blocks. For example, portions of geometry processing stage 34 and pixel processing pipeline 38 may be implemented as part of a unified shader unit. Again, graphics pipeline 30 may be configured to execute in one of a plurality of different rendering modes, including a binning rendering mode and a direct rendering mode responsive to receiving a descriptor packet from GPU driver 7 that CPU 6 is configured to execute.

Command engine 32 may receive graphics processing commands and configure the remaining processing stages within graphics processing pipeline 30 to perform various operations for carrying out the graphics processing commands. Command engine 32 may receive the command packet from GPU driver 7. The graphics processing commands may include, for example, drawing commands and graphics state commands. The drawing commands may include vertex specification commands that specify positional coordinates for one or more vertices and, in some instances, other attribute values associated with each of the vertices, such as, e.g., color coordinates, normal vectors, texture coordinates and fog coordinates. The graphics state commands may include primitive type commands, transformation commands, lighting commands, etc. The primitive type commands may specify the type of primitive to be rendered and/or how the vertices are combined to form a primitive. The transformation commands may specify the types of transformations to perform on the vertices. The lighting commands may specify the type, direction and/or placement of different lights within a graphics scene. Command engine 32 may cause geometry processing stage 34 to perform geometry processing with respect to vertices and/or primitives associated with one or more received commands.

GPU 12 receives the command packet and responsive to receiving the GPU command packet, may select between direct mode and binning mode rendering without requiring further intervention from CPU 6. GPU 12 may determine whether to use direct mode rendering or binning mode rendering based on at least one of GPU state heuristics and the data of the command packet. As another example, GPU 12 may use the GPU state to determine when direct rendering mode will render a scene faster than binning rendering mode.

As one example, GPU 12 may use GPU state, e.g., GPU processing load, power consumption, memory usage, or one or more other performance profiling characteristic of GPU 12 to select between direct and binning rendering modes. As an example of switching between direct and binning rendering based on heuristics, GPU 12 may switch from a direct rendering mode to conserve power when GPU power consumption exceeds a threshold power consumption to save power. GPU 12 may similarly switch from a binning rendering mode to a direct rendering mode when power consumption or GPU load is low.

As an example, a high GPU utilization (e.g., above 80%) can indicate that there are large amounts of time during which the GPU is busy, and that a bus of the GPU is saturated with data transfers. GPU 12 may measure the amount of data transfers occurring by comparing the measured transfer throughput with the theoretical maximum throughput of GPU 12. GPU 12 may also read values of busy counters of individual GPU hardware blocks as compared with an "always on" counter of GPU 12 (e.g., if shader processor was busy for 900 cycles of the 1000 cycles that were used by GPU 12 during a measurement period)

Geometry processing stage 34 may perform per-vertex operations and/or primitive setup operations on one or more vertices in order to generate primitive data for rasterization stage 36. Each vertex may be associated with a set of attributes, such as, e.g., positional coordinates, color values, a normal vector, and texture coordinates. Geometry processing stage 34 modifies one or more of these attributes according to various per-vertex operations. For example, geometry processing stage 34 may perform one or more transformations on vertex positional coordinates to produce modified vertex positional coordinates. Geometry processing stage 34 may, for example, apply one or more of a modeling transformation, a viewing transformation, a projection transformation, a ModelView transformation, a ModelViewProjection transformation, a viewport transformation and a depth range scaling transformation to the vertex positional coordinates to generate the modified vertex positional coordinates. In some instances, the vertex positional coordinates may be model space coordinates, and the modified vertex positional coordinates may be screen space coordinates. The screen space coordinates may be obtained after the application of the modeling, viewing, projection and viewport transformations. In some instances, geometry processing stage 34 may also perform per-vertex lighting operations on the vertices to generate modified color coordinates for the vertices. Geometry processing stage 34 may also perform other operations including, e.g., normal transformations, normal normalization operations, view volume clipping, homogenous division and/or backface culling operations.

Geometry processing stage 34 may produce primitive data that includes a set of one or more modified vertices that define a primitive to be rasterized as well as data that specifies how the vertices combine to form a primitive. Each of the modified vertices may include, for example, modified vertex positional coordinates and processed vertex attribute values associated with the vertex. The primitive data may collectively correspond to a primitive to be rasterized by further stages of graphics processing pipeline 30. Conceptually, each vertex may correspond to a corner of a primitive where two edges of the primitive meet. Geometry processing stage 34 may provide the primitive data to rasterization stage 36 for further processing.

In some examples, all or part of geometry processing stage 34 may be implemented by one or more shader programs executing on one or more shader units. For example, geometry processing stage 34 may be implemented, in such examples, by a vertex shader, a geometry shader or any combination thereof. In other examples, geometry processing stage 34 may be implemented as a fixed-function hardware processing pipeline or as a combination of fixed-function hardware and one or more shader programs executing on one or more shader units.

Rasterization stage 36 is configured to receive, from geometry processing stage 34, primitive data that represents a primitive to be rasterized, and to rasterize the primitive to generate a plurality of source pixels that correspond to the rasterized primitive. In some examples, rasterization stage 36 may determine which screen pixel locations are covered by the primitive to be rasterized, and generate a source pixel for each screen pixel location determined to be covered by the primitive. Rasterization stage 36 may determine which screen pixel locations are covered by a primitive by using techniques known to those of skill in the art, such as, e.g., an edge-walking technique, evaluating edge equations, etc. Rasterization stage 36 may provide the resulting source pixels to pixel processing pipeline 38 for further processing.

The source pixels generated by rasterization stage 36 may correspond to a screen pixel location, e.g., a destination pixel, and be associated with one or more color attributes. All of the source pixels generated for a specific rasterized primitive may be said to be associated with the rasterized primitive. The pixels that are determined by rasterization stage 36 to be covered by a primitive may conceptually include pixels that represent the vertices of the primitive, pixels that represent the edges of the primitive and pixels that represent the interior of the primitive.

Pixel processing pipeline 38 is configured to receive a source pixel associated with a rasterized primitive, and to perform one or more per-pixel operations on the source pixel. Per-pixel operations that may be performed by pixel processing pipeline 38 include, e.g., alpha test, texture mapping, color computation, pixel shading, per-pixel lighting, fog processing, blending, a pixel ownership text, a source alpha test, a stencil test, a depth test, a scissors test and/or stippling operations. In addition, pixel processing pipeline 38 may execute one or more pixel shader programs to perform one or more per-pixel operations. The resulting data produced by pixel processing pipeline 38 may be referred to herein as destination pixel data and stored in frame buffer 15. The destination pixel data may be associated with a destination pixel in frame buffer 15 that has the same display location as the source pixel that was processed. The destination pixel data may include data such as, e.g., color values, destination alpha values, depth values, etc.

Frame buffer 15 stores destination pixels for GPU 12. Each destination pixel may be associated with a unique screen pixel location. In some examples, frame buffer 15 may store color components and a destination alpha value for each destination pixel. For example, frame buffer 15 may store Red, Green, Blue, Alpha (RGBA) components for each pixel where the "RGB" components correspond to color values and the "A" component corresponds to a destination alpha value. Although frame buffer 15 and system memory 10 are illustrated as being separate memory units, in other examples, frame buffer 15 may be part of system memory 10.

As discussed above, graphics processing pipeline 30 may render a graphics image according to a particular rendering mode, including a binning rendering mode and a direct rendering mode. When rendering according to a binning rendering mode, graphics processing pipeline 30 may receive a batch of primitives (i.e., one or more primitives) to render into a resulting graphics image. To render the batch of primitives, the resulting graphics image may be subdivided into a plurality of smaller portions (e.g., tiles of pixels or bins), and graphics processing pipeline 30 may render each portion of the graphics image as a separate rendering pass.

Figure 3:
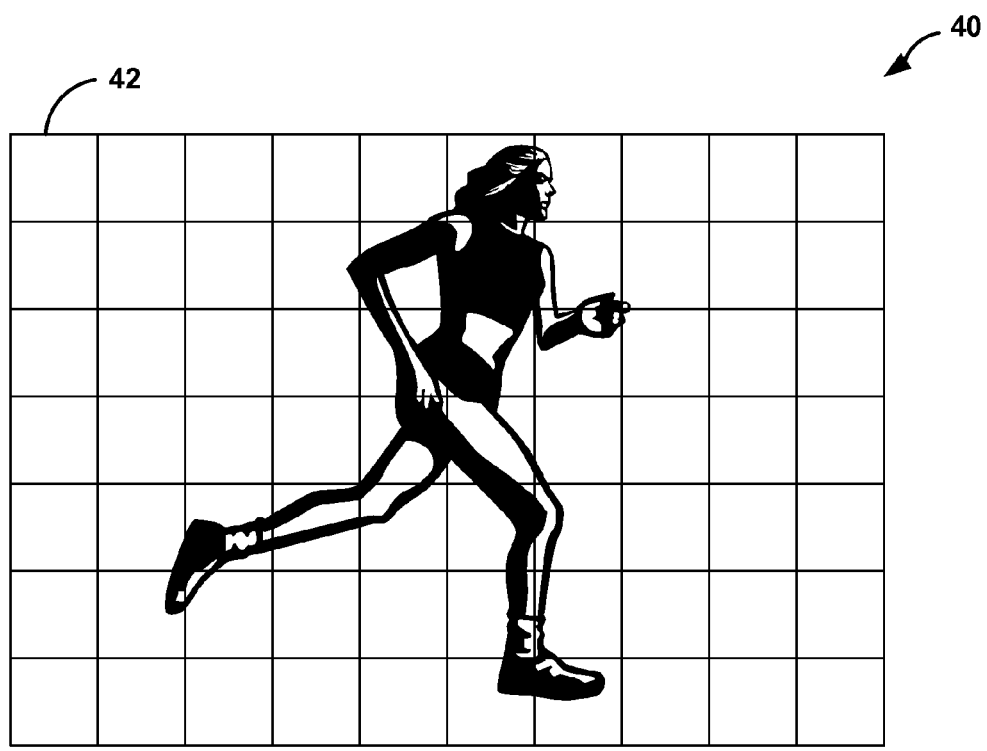
FIG. 3 is a conceptual diagram illustrating bins of a frame as used in a binning rendering mode.

FIG. 3 is a conceptual diagram illustrating a frame divided into bins for binning rendering mode. Frame 40 may be divided into a plurality of bins, such as bin 42. Typically, the graphics hardware will contain fast memory (e.g., graphics memory 14 of FIG. 2) that is of a size sufficient to hold at least one bin of data. As part of a single rendering pass for a particular portion of the frame, graphics processing pipeline 30 may render all or a subset of the batch of primitives with respect to a particular subset of the destination pixels (e.g., a particular bin of destination pixels) of the frame. After performing a first rendering pass with respect to a first bin, graphics processing pipeline 30 may perform a second rendering pass with respect to a second bin, and etc. Graphics processing pipeline 30 may incrementally traverse through the bins until the primitives associated with every bin have been rendered.

Figure 4:
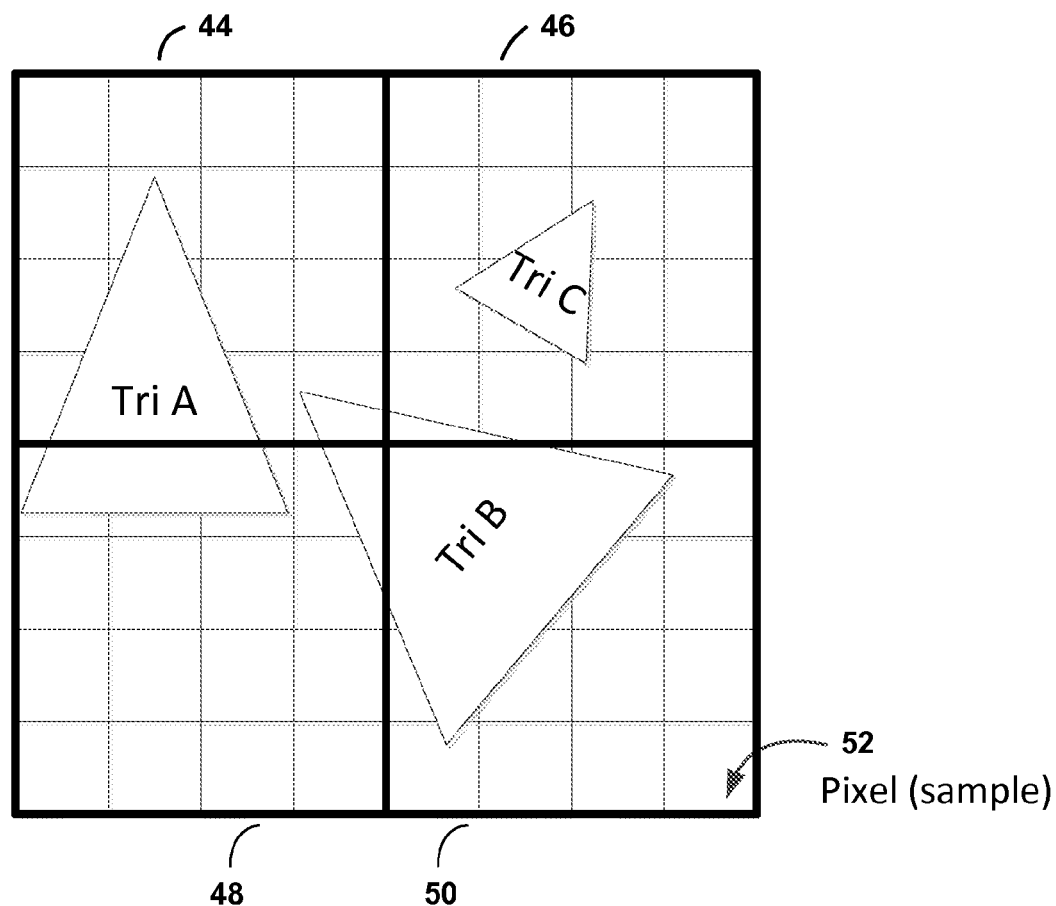
FIG. 4 is a conceptual diagram illustrating bins of a frame in more detail as used in a binning rendering mode.

FIG. 4 is a conceptual diagram showing bins used in a binning rendering mode in more detail. Bins 44, 46, 48 and 50 are rendered/rasterized to contain multiple pixels 52. One or more graphics primitives may be visible in each bin. For example, portions of triangle A (Tri A) are visible in both bin 44 and bin 48. Portions of triangle B (Tri B) are visible in each of bin 44, bin 46, bin 48, and bin 50. Triangle C (Tri C) is only visible in bin 46. During a rendering pass, in one example of a binning rendering mode, a scene is split into bins and all triangles that are in the bin are rendered (this is sometimes called software binning). In another example of a binning rendering mode, an additional step is taken before rendering to determine which triangles in the bin are actually visible in the final rendered scene (this is sometimes called hardware binning) For example, some triangles may be behind one or more other triangles and will not be visible in the final rendered scene. In this way, triangles that are not visible need not be rendered for that bin.

While performing a particular rendering pass, the pixel data for the bin associated with that particular rendering pass may be stored in a graphics memory 14 (sometimes called a bin buffer). After performing the rendering pass, graphics processing pipeline 30 may transfer the contents of graphics memory 14 to frame buffer 15. In some cases, graphics processing pipeline 30 may overwrite a portion of the data in frame buffer 15 with the data stored in graphics memory 14. In other cases, graphics processing pipeline 30 may composite or combine the data in frame buffer 15 with the data stored in graphics memory 14. After transferring the contents of graphics memory 14 to frame buffer 15, graphics processing pipeline 30 may initialize graphics memory 14 to default values and begin a subsequent rendering pass with respect to a different bin.

Figure 5:
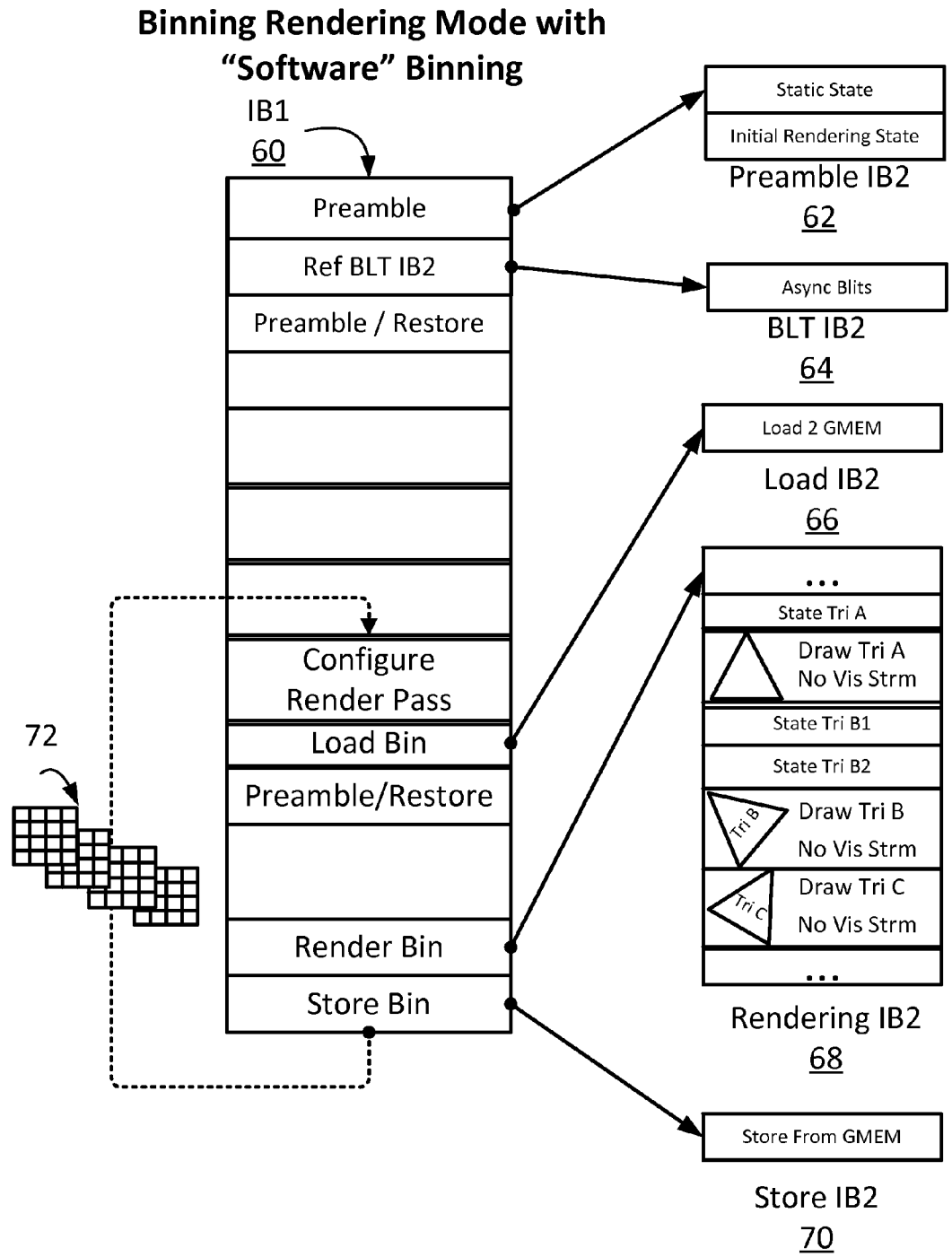
FIG. 5 is a conceptual diagram illustrating command buffers for a binning rendering mode using "software" binning.

FIG. 5 is a conceptual diagram showing an example command structure for rendering a scene using a binning rendering mode using "software" binning. Level 1 indirect buffer (IB1) 60 contains a series of execution commands for directing GPU 12 to perform the various steps of graphics memory pipeline 30. The PM4 command packet that GPU 12 receives includes a pointer to IB1 60. Each execution command in IB1 60 is essentially a pointer into one or more level 2 indirect buffers (IB2) that contain commands for various aspects of the rendering pipeline. In this way, a two or more level structure is established for executing the graphics rendering pipeline. GPU 12 may sequentially step through each execution command in IB1 60, where each execution in IB1 60 points to a specific stack of commands stored in an IB2. IB1s and IB2s may be memory that is on-board GPU 12 or may be external memory to GPU 12, such as system memory 10.

The preamble execution command in IB1 60 points to a preamble IB2 62 that contains preamble commands that are executable by GPU 12. For example, preamble IB2 62 may include commands that initializes that static state of GPU 12 and sets the initial rendering state of GPU 12. The static state of GPU includes settings that do not change based on the particular application. The rendering state, on the other hand, includes GPU settings that may change based on the particular application (e.g., an OpenGL application vs. a Direct X application). After the commands in the preamble IB2 are completed, control returns to IB1 60 to perform the next execution command.

The next execution command in IB1 60 configures the render pass for the rendering mode being employed. Again, in the example of FIG. 5, the rendering mode is the binning rendering mode using software binning. Next, the load bin execution command in IB1 points to asynchronous blitting commands in BLT (Block Transfer, i.e. a data copy) IB2 64. Blitting commands may combine several bitmaps into one using a raster operator in some examples. In the example of FIG. 5, the blitting may combine or modify graphics commands or state generated in the preamble. Next, the load bin execution command in IB1 60 points to the commands in load IB2 66. For software binning, data for a particular bin is loaded into GMEM 14 (Load 2 GMEM). Control then passes back to IB1 60 and the render bin execution command points to commands in the rendering IB2. Rendering IB2 68 consists of a series of state commands and draw commands for drawing the triangles in the loaded bin. Each draw command instructs GPU 12 to draw the triangle in accordance with a graphics processing pipeline 30 (e.g., including a geometry processing stage 34, a rasterization state 36, and/or a pixel processing pipeline 38) established by the commands and/or GPU hardware. As shown in rendering IB2 68, each of the draw commands indicates that no visibility stream is used to determine if the specific triangles are actually visible in the bin. Visibility streams are generated in a binning rendering mode that uses "hardware" binning, and will be discussed in more detail with reference to FIG. 6. The state commands in rendering IB2 68 affect the behavior of the graphics processing pipeline executed by GPU 12. For example, state commands may change the color, polygon mode (e.g., points instead of solids or lines), blending (on/off), depth testing (on/off), texturing (on/off), culling, clipping, and other logical operations. As shown in rendering IB2 68, state commands may be issued on a per triangle (or per primitive) basis. That is, the command "State Tri A" may affect the behavior of GPU 12 when drawing triangle A, while the "State Tri B1" and "State Tri B2" commands may affect the behavior of GPU 12 when drawing triangle B. The "State Tri B1" and "State Tri B2" commands merely indicate that multiple state commands may be executed for each triangle.

After all command have been executed in rendering IB2 68 (e.g., after all triangles have been drawn), control returns to IB1 60. The store bin execution command may include a pointer to a store IB2 70 that includes a command to store the rendered bin from GMEM 14 into memory (e.g., frame buffer 15). The render pass (e.g., the execution commands from configure render pass to store bin as shown in IB1 60) are then repeated for each bin 72 for one or more frames.

Figure 6:
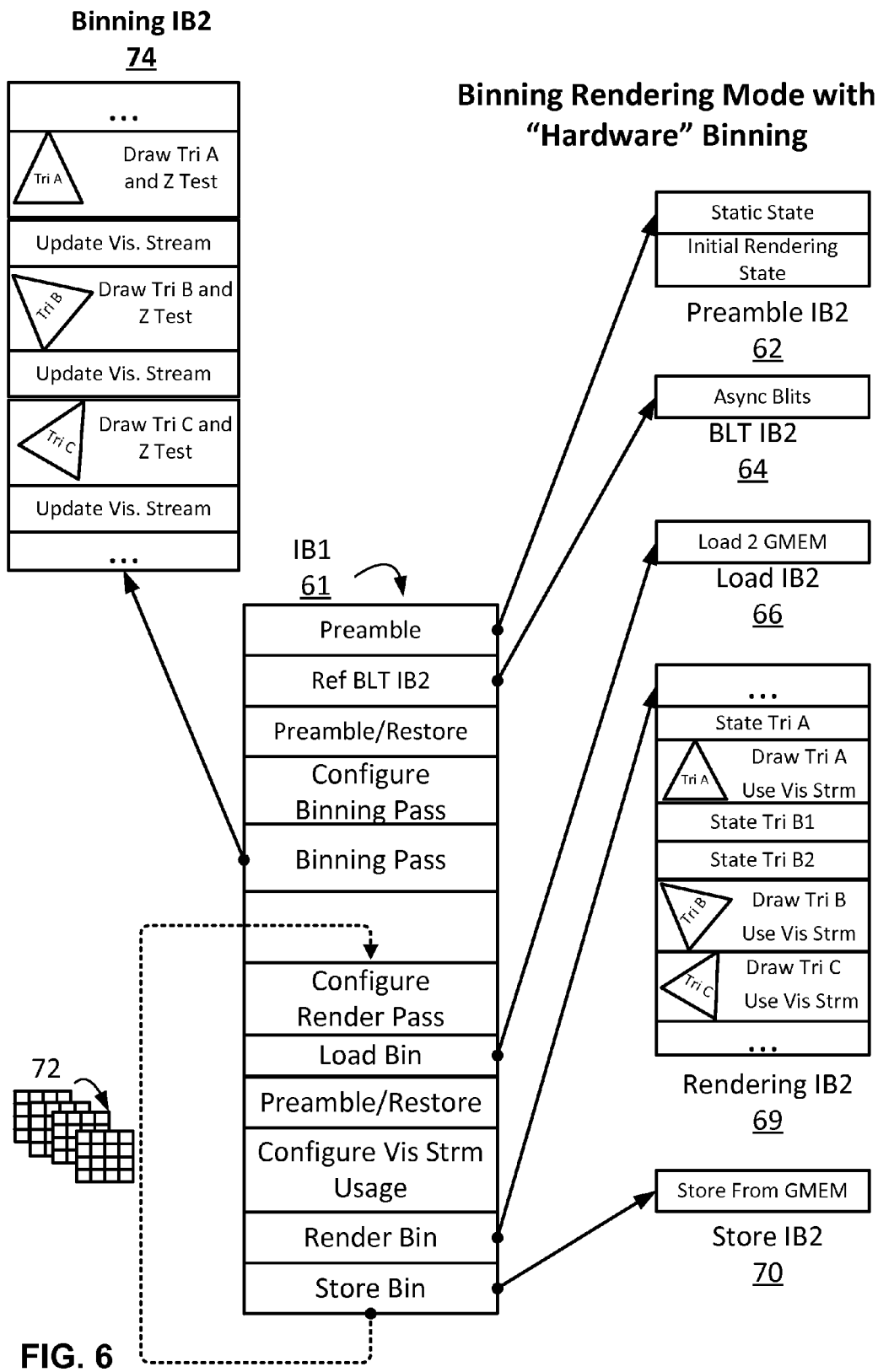
FIG. 6 is a conceptual diagram illustrating command buffers for a binning rendering mode using "hardware" binning.

FIG. 6 is a conceptual diagram showing an example command structure for rendering a scene using a binning rendering mode using "hardware" binning. The execution commands in IB1 61 are similar to those of IB1 60 of FIG. 6 with the exception of commands related to a "binning" pass. A "binning" pass is used to generate a visibility stream that indicates whether or not specific triangles in the bin are actually visible in the final rendered scene. For example, some triangles may be behind another triangle in the scene and will not be visible in some scenarios (e.g., when the triangle in front is opaque or when no blending is used). Before rendering bins 72, IB1 61 may include a binning pass execution command that points to commands in binning IB2 74. Binning IB2 74 includes commands that cause GPU 12 to perform a simplified version of a graphics pipeline (e.g., a simplified version of rendering IB2 69), but adds the step of updating a visibility stream for each triangle in the bin based on a depth test (Z test) that determines whether or not the triangle is visible in the final rendered scene.

The goal of the binning pass is to identify triangles that intersect the current bin. As such, only the position of the vertices of the triangle need to be determined to identify if a triangle intersects a particular bin. The binning pass utilizes a simplified vertex shader that only includes instructions that affect the position of the vertices. For example, color instructions, texture coordinates and other instructions that do not affect the position of triangle vertex may be removed from the simplified vertex shader used for the binning pass. The binning pass also uses coarse rasterization, rather than fine rasterization, to determine an approximate depth of each triangle. Coarse rasterization calculates a depth value at a lower precision (e.g., using a lower number of bits) than fine rasterization. Only approximate depth values are necessary to determine if a triangle is visible in the bin. Pixel shaders are not used in the binning pass.

The binning pass then utilizes a depth test on the coarse depth values to determine if a triangle is visible in the bin relative to other triangles in the bin. Based on this depth test, a visibility stream is updated. The visibility stream may be a string of bits that indicates whether or not a specific triangle in the rendered bin is visible (e.g., 1 indicates a triangle is visible, 0 indicates a triangle is not visible).

The commands in rendering IB2 69 are similar to those of rendering IB 68 in FIG. 5, but for the use of the visibility stream. Draw commands (e.g., Draw Tri A, Draw Tri B, Draw Tri C, etc.) in the rendering IB2 69 may use the visibility stream generated by the binning pass to determine whether or not it is necessary to draw a specific triangle. For example, drawing may be skipped for triangles indicated as not visible by the visibility stream.

As opposed to rendering a frame bin by bin, as in a binning rendering mode, a direct rendering renders an entire frame in one pass through a graphics pipeline. Direct rendering, typically utilizes slower system memory when executed in binning-based architectures with a limited amount of graphics memory.

Figure 7:
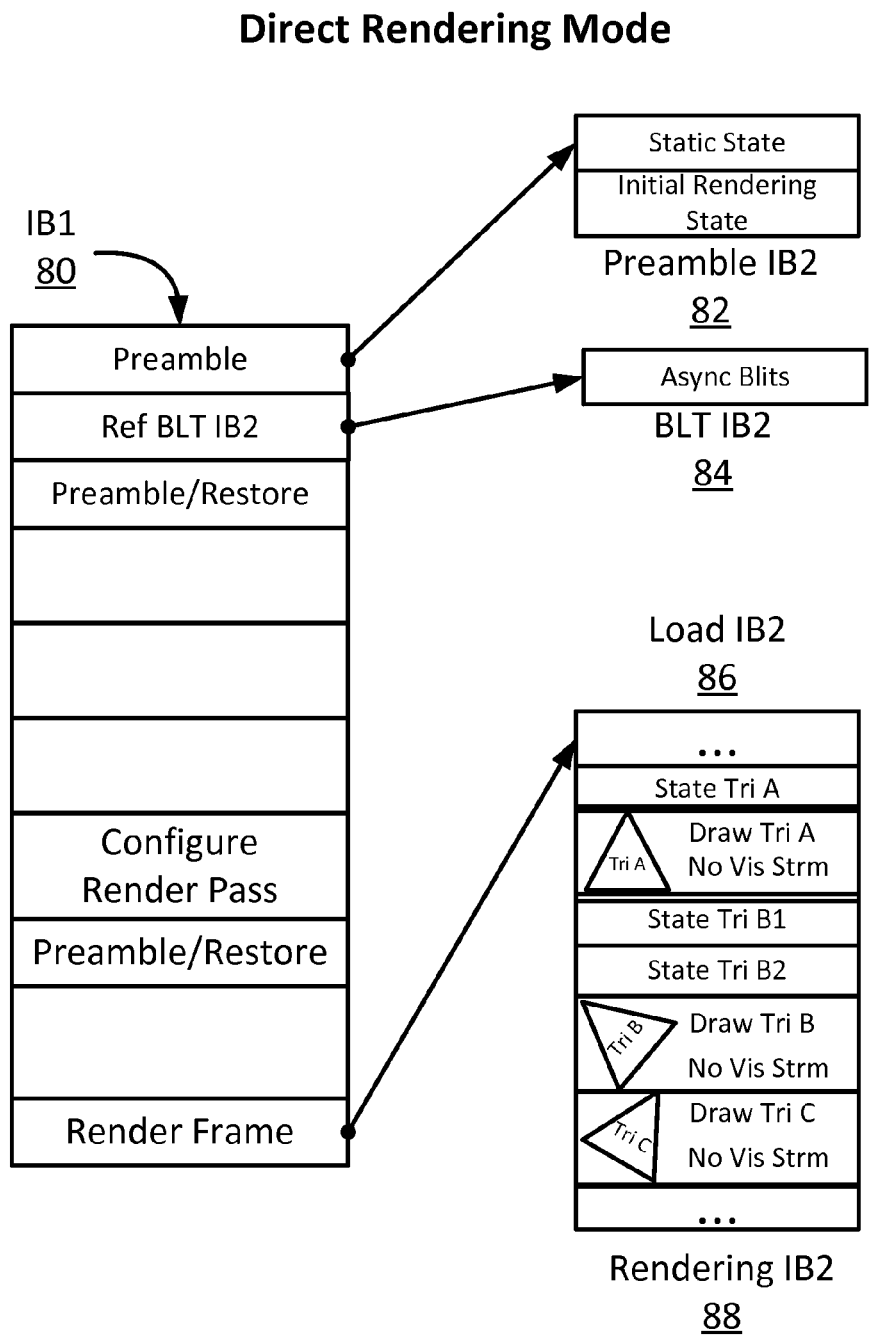
FIG. 7 is a conceptual diagram illustrating command buffers for a direct rendering mode.

FIG. 7 is a conceptual diagram showing an example command structure for rendering a scene using a direct rendering mode. The commands for a direct rendering mode are similar to those for software binning in FIG. 5, but instead of rendering on a bin by bin basis, an entire frame is rendered in one pass. For example, the execution commands in IB1 80 are similar to those in IB1 60, but rather than loading, rendering and storing bins, the execution commands in IB1 80 point to commands in respective IB2s that render store frames. The asynchronous blitting commands of IB1 80 point to asynchronous blitting commands in BLT IB2 84. More specifically, the commands in IB1 80 may include preamble, preamble/restore, configure render pass, and render frame. The render frame execution command in IB1 80 points to rendering IB2 88 that contains instructions causing GPU 12 to draw the primitives in the frame. Like software binning, rendering in a direct rendering mode does not make use of a hardware binning pass or a visibility stream. Any drawing commands in rendering IB2 88 (e.g., Draw Tri A, Draw Tri B, Draw Tri C) would utilize GMEM memory to store the rendered triangles.

The preamble execution command in IB1 80 points to preamble IB2 82 that contains instructions for establishing the static state and the initial rendering state of GPU 12. These commands act similarly to the commands in preamble IB2 62 of FIG. 6, but setup the rendering state for a direct rendering mode rather than a binning rendering mode.

As illustrated in FIGS. 5-7, both direct mode rendering and binning mode rendering utilize IB2s. During the rendering pass or rendering loop, GPU 12 loops over the rendering IB2s for binning and for dynamic punting logic based on information about the scene to be rendered. In previous techniques, a driver executing on a processor other than GPU 12 (e.g. GPU driver 7 executing on CPU 6) was responsible for determining whether to utilize direct rendering mode or binning rendering to when rendering a portion of a frame. When utilizing CPU 6 to determine whether to use direct or rendering mode to render a scene, the process may be extremely CPU-bound (i.e. may have a relatively high utilization of CPU 6). When GPU 12 determines whether to utilize direct mode rendering or binning mode rendering, the result may also depend on capability disparities between direct mode rendering and binning mode rendering.

In accordance with the techniques of this disclosure, GPU 12 may receive a GPU command packet, e.g., from GPU driver 7 executing on CPU 6. The command packet may indicate that GPU 12 may utilize either direct rendering or binning mode rendering for rendering a portion of a frame to be rendered by GPU 12. Additionally, the command packet may encapsulate configuration information. The command packet may also refer to (or point to) one or more IB2s for direct mode rendering and/or hardware and/or binning rendering, such as IB2s 82, 84, 86, 88, and 90, as some examples.

Before an application (e.g., software application 24 of FIG. 2) begins rendering a scene, GPU 12 may determine a rendering mode (e.g., a determination between binning rendering and direct rendering) based on scene information in included in the command packet. GPU 12 may also determine whether to use direct rendering or binning based on GPU state heuristics. In some techniques, GPU 12 may also determine the rendering mode based on data from previous rendering passes. However, this technique may not always be an optimal way to determine the rendering mode, as the application may switch rendering techniques before rendering a new scene. As such, this technique may lead to inefficient rendering until enough new data has been accumulated to switch to the proper rendering mode.

Additionally, heuristic data concerning past renderings may not always provide for the most optimal rendering mode for the current scene if the current scene is different from previous scenes. For example, an application that would optimally use rapidly changing rendering modes may lead to many false predictions. In accordance with the techniques of this disclosure, GPU 12 can determine the power usage of GPU 12, and may determine the rendering mode based on the power usage. In another example in accordance with the techniques of this disclosure, GPU 12 may determine the current or future utilization of GPU 12 and may determine a rendering mode to use for rendering at least a portion of a frame based on the current or future utilization of GPU 12. In accordance with the techniques of this disclosure, GPU 12 may use other heuristics not specifically described herein, and GPU 12 may execute any heuristics described herein without intervention or interference from CPU 6.

The following techniques are applicable for a graphics processing system using any graphics application program interface (API), and in particular, are suitable for graphics APIs that utilize binning rendering. Examples of such APIs include Microsoft's DirectX9 (DX9), DX10, and DX11, DX12, as well as open source graphics APIs, such as OpenGL and OpenGL ES, and computing APIs, such as OpenCL and DirectCompute.

Figure 8:
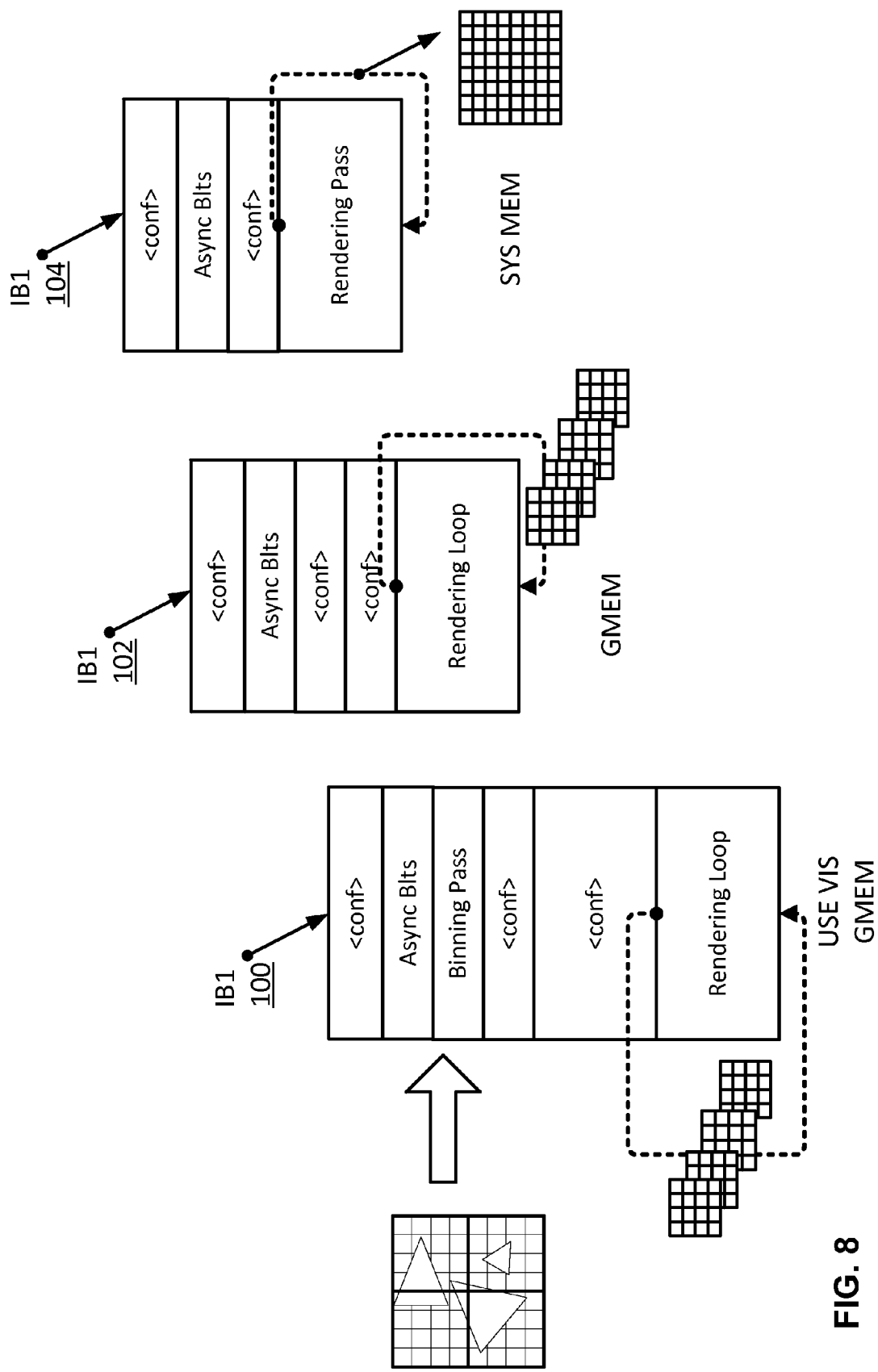
FIG. 8 is a conceptual diagram illustrating command buffers for different rendering modes.

FIG. 8 is a conceptual diagram illustrating command buffers for different rendering modes. FIG. 8 includes IB1, 100, IB1 102, and IB1 104. Each of IB1s 100, 102, and 104 may comprise IB1 buffers that correspond to a particular rendering mode. Each IB1 may correspond to a command buffer for hardware binning. IB1 102 may correspond to a buffer for software binning, and IB1 may correspond to a buffer for direct mode rendering. According to the techniques illustrated in FIG. 8, to utilize a different rendering mode, GPU 12 must read from a different IB1, which may require GPU driver 7 to transfer multiple IB1s to GPU 12. Additionally, GPU 12 may be required to store multiple IB1s, which consumes additional memory of GPU 12. The techniques of this disclosure do not require multiple IB1s to be transferred to GPU1, unlike the techniques illustrated with respect to FIG. 8.

Figure 9:
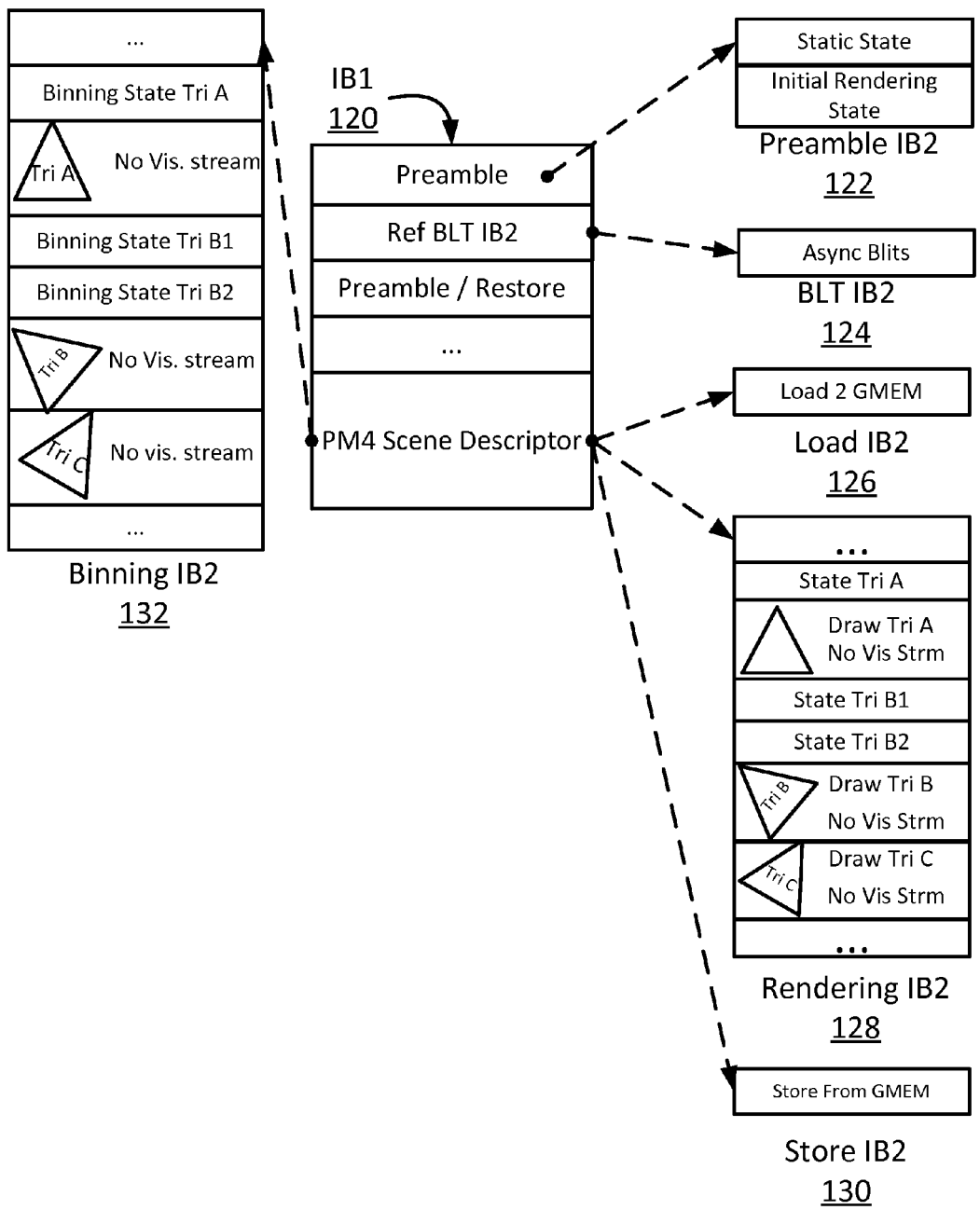
FIG. 9 is a conceptual diagram illustrating an example command structure for rendering a scene using a direct rendering mode or binning rendering mode in accordance with the techniques of this disclosure.

FIG. 9 is a conceptual diagram illustrating an example command structure for rendering a scene using a direct rendering mode or binning rendering mode in accordance with the techniques of this disclosure. In the example of FIG. 9, GPU driver 7 or GPU 12 may generate or receive IB1 120. IB1 120 is similar to other IB1s described with respect to FIGS. 5-7. However, in accordance with the techniques of this disclosure, IB1 120 includes a command packet that may comprise a PM4 scene descriptor.

In the example of FIG. 9, IB1 120 refers to (or points to) call binning IB2 132, as well as preamble IB2 122, BLT IB2 124, and rendering IB2 128, and store IB2 130. A GPU command packet, e.g. the PM4 scene descriptor of IB1 120 may encapsulate the aforementioned IB2s so that GPU 12 can perform hardware binning, software binning, or direct mode rendering based on various heuristics. The PM4 scene descriptor of IB1 120 refers to IB2s 122, 123, 126, 128, 130, and 132 by referencing the memory addresses of those IB2s. PM4 descriptor 120 does not however necessarily include IB2s 122, 124, 126, 128, 130, and 132. GPU 12 may use the IB2s to which the PM4 scene descriptor refers to generate an execution order, e.g. an execution order similar to one of the rendering modes illustrated in FIGS. 5-7.

By including the scene descriptor in the command packet and allowing GPU 12 to determine the rendering mode for portions of a frame, the techniques of this disclosure provide multiple advantages. Previous technology for switching between direct mode and binning mode rendering required the generation of multiple IB2s, and required looping over the rendering IB2s for binning and dynamic punting logic (e.g., relying on graphics API-provided function calls rather than "hook"-based function calls) based on driver-based heuristics. The generation, iteration, and driver-based heuristics, and hooking logic are all extremely CPU-bound (i.e. consume significant CPU resources).

The PM4 scene descriptor illustrated in FIG. 9 allows GPU 12 to conditionally trigger different rendering modes, and allows GPU 12 to integrate extra GPU state-specific heuristics in the rendering mode decision mechanism. In one example, CPU 6 may include scene descriptor heuristics in the PM4 descriptor. GPU 12 may evaluate the heuristics that are included in the PM4 descriptor to determine the rendering mode. In another example, GPU 12 may determine the rendering mode based on GPU hardware state analysis, which may include power state, memory usage, and/or rendering load, in some examples. In another example, the heuristics may include determining hardware capabilities of GPU 12 such that GPUs having different hardware capabilities may render scenes differently. Additionally, the determined heuristics may include other GPU performances queries, as well as state determinations at the time of execution not explicitly disclosed herein. The techniques of this disclosure also move the punting (i.e. determining when to switch from binning mode to direct rendering mode) and rendering logic from CPU 6 and/or GPU driver 7 to GPU 12.

Additionally, moving the GPU rendering mode decision to GPU 12 eliminates overhead from CPU 6, reduces memory footprint and saves IB1 command space used for submitting queued graphics commands. Additionally, GPU-based or GPU-assisted heuristics can be performed or embedded on GPU 12 without interaction from CPU 6 and/or GPU driver 7 with the dynamic punting process. The techniques of this disclosure also reduce performance penalties associated with the so-called "small batch" problem, caused by batching many small rendering calls, which may be CPU intensive.

Figure 10:
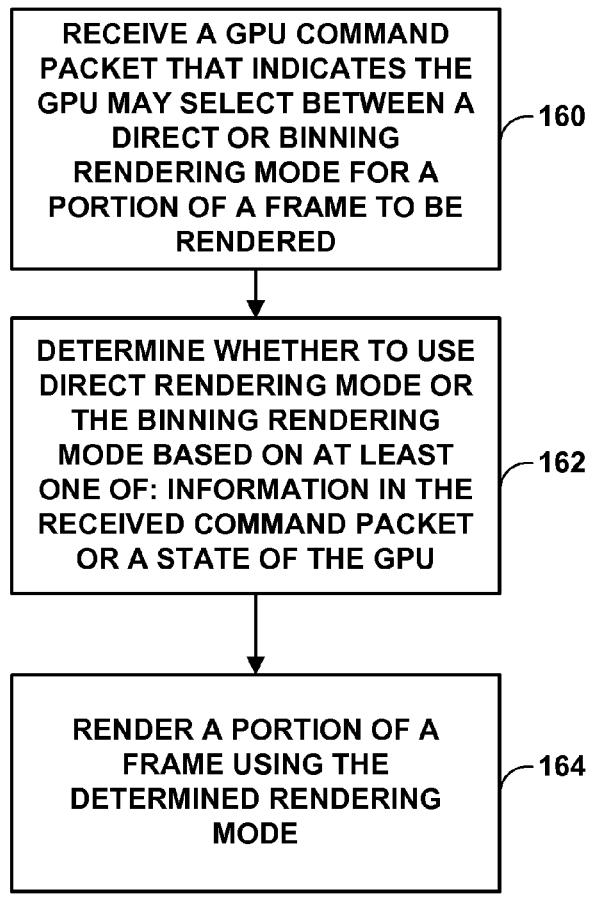
FIG. 10 is a flowchart illustrating a method according to one example of the disclosure.

FIG. 10 is a flowchart illustrating a method according to one example of the disclosure. The method of FIG. 10 may be performed by GPU 12, and/or any other hardware, firmware, software element, or combination thereof, residing on computing device 2. CPU 6 may be configured to generate rendering commands for rendering a frame, such as an IB1. CPU 6 may transmit a GPU command packet to GPU 12. In various examples, the command packet may comprise a PM4 format command packet.

GPU 12 may receive from CPU 6, the command packet. The command packet may indicate that GPU 12 may select between a direct rendering mode or a binning rendering mode for a portion of a frame to be rendered by GPU 12 (160). GPU 12 may determine whether to use the direct rendering mode or the binning rendering mode for the portion of the frame to be rendered based on at least one of: information in the received command packet or a state of GPU 12 (162), and render the portion of the frame using the determined direct rendering mode or the binning rendering mode (164). In various examples, to rendering the portion of the frame, GPU 12 may iterate through a rendering loop, and/or perform dynamic punting.

In various examples, to determine whether to utilize the direct rendering mode or the binning rendering mode, GPU 12 may execute a heuristic to determine whether to utilize the direct rendering mode or the binning rendering mode for the portion of the frame to be rendered. In some examples, GPU 12 may determine whether to utilize the direct rendering mode or the binning rendering mode based on a power consumption of GPU 12. GPU 12 may also determine whether to utilize the direct rendering mode or the bin rendering mode based on some resource utilization of GPU 12.

In various examples, the command packet may comprise a scene descriptor packet that encapsulates information required for rendering the frame to be rendered, such as indirect buffer (IB2) information and/or configuration pairs. The encapsulated information of the scene descriptor may further include resolution information about a scene to which the frame belongs.

In some examples, the GPU state may comprise a power consumption of the GPU, and GPU 12 may further determine to use the binning rendering mode to render the portion of the frame when the power consumption of the GPU exceeds a threshold power consumption value. The GPU state may also comprise a utilization load of the GPU, and GPU 12 may determine determining to use the binning rendering mode when the utilization load of the GPU exceeds a utilization value. The GPU state may also comprise a memory usage of the GPU.

In various examples, the received command packet may comprise a scene descriptor packet that encapsulates information required for rendering the frame to be rendered. The encapsulated information of the scene descriptor may include indirect buffer information and configuration pairs in some examples. The encapsulated information of the scene descriptor may also include resolution information about the frame to be rendered.

In various examples, the information in the received command packet may comprise an amount of geometry in the portion of the frame to be rendered. The received command packet may also comprise all the bins required for rendering the frame to be rendered by the GPU. In some examples, GPU 12 may determine whether to use the direct rendering mode or the binning rendering mode based on rendering information from a frame previously rendered by the GPU.

In some examples, GPU 12 may be further configured to determine an amount of overdraw that will occur when rendering the frame. GPU 12 may determine whether to use the direct rendering mode or the binning rendering mode based on the amount of overdraw that will occur In one or more examples, the functions described above may be implemented in hardware, software, firmware, or any combination thereof. If implemented in software, the functions may be stored as one or more instructions or code on an article of manufacture comprising a non-transitory computer-readable medium. Computer-readable media may include computer data storage media. Data storage media may be any available media that can be accessed by one or more computers or one or more processors to retrieve instructions, code and/or data structures for implementation of the techniques described in this disclosure. By way of example, and not limitation, such computer-readable media can comprise RAM, ROM, EEPROM, CD-ROM or other optical disk storage, magnetic disk storage, or other magnetic storage devices, flash memory, or any other medium that can be used to carry or store desired program code in the form of instructions or data structures and that can be accessed by a computer. Disk and disc, as used herein, includes compact disc (CD), laser disc, optical disc, digital versatile disc (DVD), floppy disk and Blu-ray disc where disks usually reproduce data magnetically, while discs reproduce data optically with lasers. Combinations of the above should also be included within the scope of computer-readable media.

The code may be executed by one or more processors, such as one or more DSPs, general purpose microprocessors, ASICs, FPGAs, or other equivalent integrated or discrete logic circuitry. In addition, in some aspects, the functionality described herein may be provided within dedicated hardware and/or software modules. Also, the techniques could be fully implemented in one or more circuits or logic elements.

The techniques of this disclosure may be implemented in a wide variety of devices or apparatuses, including a wireless handset, an integrated circuit (IC) or a set of ICs (e.g., a chip set). Various components, modules, or units are described in this disclosure to emphasize functional aspects of devices configured to perform the disclosed techniques, but do not necessarily require realization by different hardware units. Rather, as described above, various units may be combined in a codec hardware unit or provided by a collection of interoperative hardware units, including one or more processors as described above, in conjunction with suitable software and/or firmware.

Various examples have been described. These and other examples are within the scope of the following claims.

What is claimed is:

1. A method of graphics processing comprising:
receiving, by a graphics processing unit (GPU), a GPU command packet that indicates the GPU may select a rendering mode from a plurality of rendering modes for rendering at least a portion of a frame, wherein the plurality of rendering modes includes a first rendering mode and a second rendering mode;
selecting, by the GPU, the first rendering mode from the plurality of rendering modes for rendering at least the portion of the frame based on information in the received GPU command packet, wherein the information in the received GPU command packet comprises a scene descriptor for use in rendering at least the portion of the frame, wherein the scene descriptor includes a plurality of pointers to one or more second level indirect buffers for the first rendering mode and one or more second level indirect buffers for the second rendering mode;
generating, by the GPU, a series of execution commands for the selected first rendering mode using one or more execution commands included in the one or more second level indirect buffers for the first rendering mode, wherein generating the series of execution commands comprises using, by the GPU, a subset of the plurality of pointers that are referred to by the scene descriptor as corresponding to the first rendering mode; and
rendering, by the GPU, at least the portion of the frame using the series of execution commands for the selected first rendering mode.

2. The method of claim 1, further comprising:
selecting, by the GPU, the first rendering mode from the plurality of rendering modes for rendering at least the portion of the frame based on the information in the received GPU command packet and a state of the GPU, wherein the state of the GPU comprises information corresponding to at least one of: a power consumption of the GPU, a processing load of the GPU, a memory usage of the GPU, or a utilization load of the GPU.

3. The method of claim 1, further comprising:
selecting the first rendering mode from the plurality of rendering modes based on a state of the GPU indicating that power consumption of the GPU exceeds a threshold power consumption value, wherein the selected first rendering mode is a binning rendering mode.

4. The method of claim 1, wherein the first rendering mode is a direct rendering mode and the second rendering mode is a binning rendering mode, or wherein the second rendering mode is a direct rendering mode and the first rendering mode is a binning rendering mode.

5. The method of claim 1, further comprising:
selecting the first rendering mode from the plurality of rendering modes based on a state of the GPU indicating that utilization load of the GPU exceeds a utilization value, wherein the selected first rendering mode is a binning rendering mode.

6. The method of claim 1, wherein the scene descriptor includes configuration pairs.

7. The method of claim 1, wherein the scene descriptor includes resolution information about at least the portion of the frame.

8. The method of claim 1, wherein the information in the received GPU command packet comprises all bins required for rendering at least the portion of the frame.

9. The method of claim 1, the method further comprising:
determining an amount of overdraw that will occur when rendering at least the portion of the frame; and
selecting the first rendering mode from the plurality of rendering modes based on the amount of overdraw that will occur.

10. A device comprising a graphics processing unit (GPU), wherein the GPU further comprises:
a memory; and
at least one processor configured to:
receive a GPU command packet that indicates the GPU may select a rendering mode from a plurality of rendering modes for rendering at least a portion of a frame, wherein the plurality of rendering modes includes a first rendering mode and a second rendering mode;
select the first rendering mode from the plurality of rendering modes for rendering at least the portion of the frame based on information in the received GPU command packet, wherein the information in the received GPU command packet comprises a scene descriptor for use in rendering at least the portion of the frame, wherein the scene descriptor includes a plurality of pointers to one or more second level indirect buffers for the first rendering mode and one or more second level indirect buffers for the second rendering mode;
generate a series of execution commands for the selected first rendering mode using one or more execution commands included in the one or more second level indirect buffers for the first rendering mode, wherein, to generate the series of execution commands, the at least one processor is configured to use a subset of the plurality of pointers that are referred to by the scene descriptor as corresponding to the first rendering mode; and
render at least the portion of the frame using the series of execution commands for the selected first rendering mode; and
store at least the portion of the frame rendered using the series of execution commands for the selected first rendering mode in the memory.

11. The device of claim 10, wherein the at least one processor is further configured to:

select the first rendering mode from the plurality of rendering modes for rendering at least the portion of the frame based on the information in the received GPU command packet and a state of the GPU, wherein the state of the GPU comprises information corresponding to at least one of: a power consumption of the GPU, a processing load of the GPU, a memory usage of the GPU, or a utilization load of the GPU.

12. The device of claim 10, wherein the at least one processor is further configured to:
select the first rendering mode from the plurality of rendering modes based on a state of the GPU indicating that power consumption of the GPU exceeds a threshold power consumption value, wherein the selected first rendering mode is a binning rendering mode.

13. The device of claim 10, wherein the plurality of rendering modes includes a direct rendering mode and a binning rendering mode.

14. The device of claim 10, wherein the at least one processor is further configured to:
select the first rendering mode from the plurality of rendering modes based on a state of the GPU indicating that utilization load of the GPU exceeds a utilization value, wherein the selected first rendering mode is a binning rendering mode.

15. The device of claim 10, wherein the scene descriptor includes configuration pairs.

16. The device of claim 10, wherein the scene descriptor includes resolution information about at least the portion of the frame.

17. The device of claim 10, wherein the information in the received GPU command packet comprises all bins required for rendering at least the portion of the frame.

18. The device of claim 10, wherein the at least one processor is further configured to:
determine an amount of overdraw that will occur when rendering at least the portion of the frame; and
select the first rendering mode from the plurality of rendering modes based on the amount of overdraw that will occur.

19. A device comprising a graphics processing unit (GPU), wherein the GPU further comprises:
means for receiving a GPU command packet that indicates the GPU may select a rendering mode from a plurality of rendering modes for rendering at least a portion of a frame, wherein the plurality of rendering modes includes a first rendering mode and a second rendering mode;
means for selecting the first rendering mode from the plurality of rendering modes for rendering at least the portion of the frame based on information in the received GPU command packet, wherein the information in the received GPU command packet comprises a scene descriptor for use in rendering at least the portion of the frame, wherein the scene descriptor includes a plurality of pointers to one or more second level indirect buffers for the first rendering mode and one or more second level indirect buffers for the second rendering mode;
means for generating a series of execution commands for the selected first rendering mode using one or more execution commands included in the one or more second level indirect buffers for the first rendering mode, wherein the means for generating the series of execution commands comprises means for using a subset of the plurality of pointers that are referred to by the scene descriptor as corresponding to the first rendering mode; and means for rendering at least the portion of the frame using the series of execution commands for the selected first rendering mode.

20. The device of claim 19, further comprising:

means for selecting the first rendering mode from the plurality of rendering modes based on a state of the GPU indicating that power consumption of the GPU exceeds a threshold power consumption value, wherein the selected first rendering mode is a binning rendering mode.

21. The device of claim 19, further comprising:

means for selecting the first rendering mode from the plurality of rendering modes based on a state of the GPU indicating that utilization load of the GPU exceeds a utilization value, wherein the selected first rendering mode is a binning rendering mode.

22. The device of claim 19, further comprising:

means for selecting the first rendering mode from the plurality of rendering modes for rendering at least the portion of the frame based on the information in the received GPU command packet and a state of the GPU, wherein the state of the GPU comprises information corresponding to at least one of: a power consumption of the GPU, a processing load of the GPU, a memory usage of the GPU, or a utilization load of the GPU.

23. The device of claim 19, wherein the plurality of rendering modes includes a direct rendering mode and a binning rendering mode.

24. The device of claim 19, wherein the information in the received GPU command packet comprises all bins required for rendering at least the portion of the frame.

25. The device of claim 19, wherein the scene descriptor includes configuration pairs, or wherein the scene descriptor includes resolution information about at least the portion of the frame.

26. A non-transitory computer-readable storage medium having instructions stored thereon that, when executed, cause a GPU to:

receive a GPU command packet that indicates the GPU may select a rendering mode from a plurality of rendering modes for rendering at least a portion of a frame, wherein the plurality of rendering modes includes a first rendering mode and a second rendering mode;

select the first rendering mode from the plurality of rendering modes for rendering at least the portion of the frame based on information in the received GPU command packet, wherein the information in the received GPU command packet comprises a scene descriptor for use in rendering at least the portion of the frame, wherein the scene descriptor includes a plurality of pointers to one or more second level indirect buffers for the first rendering mode and one or more second level indirect buffers for the second rendering mode;

generate a series of execution commands for the selected first rendering mode using one or more execution commands included in the one or more second level indirect buffers for the first rendering mode, wherein, to generate the series of execution commands, the GPU is caused to use a subset of the plurality of pointers that are referred to by the scene descriptor as corresponding to the first rendering mode; and render at least the portion of the frame using the series of execution commands for the selected first rendering mode.

27. The non-transitory computer-readable storage medium of claim 26, further comprising instructions stored thereon that, when executed, cause the at least one processor of a GPU to:

select the first rendering mode from the plurality of rendering modes for rendering at least the portion of the frame based on the information in the received GPU command packet and a state of the GPU, wherein the state of the GPU comprises information corresponding to at least one of: a power consumption of the GPU, a processing load of the GPU, a memory usage of the GPU, or a utilization load of the GPU.

28. The non-transitory computer-readable storage medium of claim 26, wherein the plurality of rendering modes includes a direct rendering mode and a binning rendering mode.

29. The non-transitory computer-readable storage medium of claim 26, wherein the information in the received GPU command packet comprises all bins required for rendering at least the portion of the frame.

30. The non-transitory computer-readable storage medium of claim 26, wherein the scene descriptor includes configuration pairs, or wherein the scene descriptor includes resolution information about at least the portion of the frame.

* * * * *